United States Patent Office 3,055,891
Patented Sept. 25, 1962

3,055,891
N-(AMINOALKYLCARBAMOYLPIPERIDINO-ALKYL)PHENOTHIAZINES
John W. Cusic, Skokie, and Robert W. Hamilton, Wilmette, Ill., assignors to G. D. Searle & Co., Chicago, Ill., a corporation of Delaware
No Drawing. Filed Mar. 21, 1960, Ser. No. 16,148
11 Claims. (Cl. 260—243)

This invention relates to N-(aminoalkylcarbamoylpiperidinoalkyl)phenothiazines and processes for the manufacture thereof. More particularly, this invention relates to chemical compounds of the formula

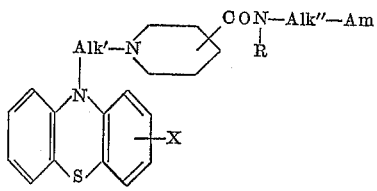

wherein Alk' and Alk" represent alkylene radicals; R represents hydrogen or an alkyl radical; Am represents an optionally alkylated amino radical; and X represents hydrogen, halogen, or an alkanoyl radical.

Those skilled in the art will recognize that alkylene radicals are, exclusively, radicals of the formula

alkyl radicals are, exclusively, radicals of the formula

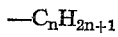

and alkanoyl radicals are, exclusively, radicals of the formula

$n$ designating a positive integer in each instance. By the same token, it will be recognized that "alkylated," as used herein and wherever the term is precisely employed, denotes the introduction of one or more alkyl radicals.

Among the alkylene radicals represented by Alk' and Alk" in the generic formula for compounds of this invention, especially lower alkylene radicals are preferred, for example, methylene, ethylene, trimethylene, propylene, tetramethylene, 2,2-dimethyl-1,3-propylene, and the like.

The alkyl radicals represented by R in the generic formula also are desirably of lower order—illustratively, methyl, ethyl, propyl, butyl, isobutyl, sec-butyl, tert-butyl, pentyl, isopentyl, tert-pentyl, neopentyl, hexyl, isohexyl, heptyl, octyl, etc.—as are the alkanoyl radicals represented by X. Examples of lower alkanoyl radicals optimally adapted to the purpose of this invention are acetyl, propionyl, and butyryl radicals.

Halogens—represented by X in the generic formula—of choice are fluorine, chlorine, bromine, and iodine, especially chlorine in the 2-position.

Am in the generic formula for compounds of this invention subsumes both the amino radical, —NH₂, and the amino radical as modified by introduction of one or two alkyl radicals—especially lower alkyl radicals of the type hereinbefore set out. The alkyl groupings present may either be discrete, as when Am designates a radical of the formula

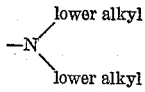

or they may be joined together directly or through oxygen or a second nitrogen atom to compose a cyclic amino radicals preferably comprising at least four and not more than seven carbon atoms. Illustrative of the cyclic amino radicals contemplated by Am are pyrrolidino (i.e., 1-pyrrolidinyl), 2-methylpyrrolidino, 2,5-dimethylpyrrolidino, 3-methyl-4-ethylpyrrolidino, piperidino, 3-methylpiperidino, 2,6-dimethylpiperidino, morpholino, piperazino (i.e., 1-piperazinyl), 4-methylpiperazino, and like monovalent 5- and 6-membered heterocyclic groupings. It follows that in every instance these radicals attach to the alkylene groupings represented by Alk" through nitrogen.

Equivalent to the basic amines of this invention for the purposes here described are non-toxic acid addition and quaternary ammonium salts thereof, the compositions of which may be symbolized by

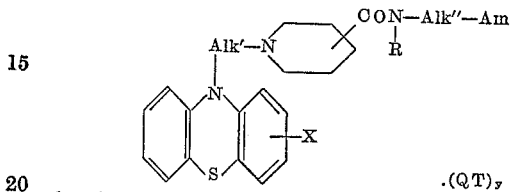

wherein Alk', Alk", R, Am, and X have the meanings hereinbefore assigned; Q is selected from among hydrogen and lower alkyl, hydroxy(lower alkyl), and lower alkenyl radicals, as also such aralkyl radicals as benzyl, phenethyl, and naphthylmethyl; T is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, ascorbate, benzoate, cinnamate, or the like—which, in combination with the cationic portion of a salt aforesaid, is neither pharmacologically nor otherwise undesirable in physiological dosage; and Y is a positive integer amounting to less than five.

The compounds to which this invention relates are useful because of their valuable pharmacological properties. Quite unexpectedly, they manifest an inhibitory effect on the heat, swelling, redness, and granuloma formation characteristic of the inflammatory response to tissue injury. They also depress the central nervous system, as one result of which they are useful barbiturate potentiators.

Upon oxidation of the basic tertiary nitrogen atoms present, corresponding N-oxides of improved therapeutic index are produced. The therapeutic index of a given compound is the ratio of its effectiveness to its toxic dose.

The manufacture of the subject products proceeds by heating in an inert solvent medium an appropriate 10-haloalkylphenothiazine

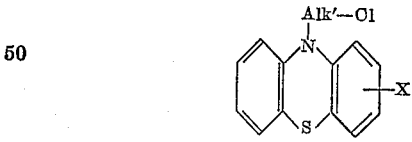

wherein Alk' and X are defined as before, with a 4-aminoalkylcarbamoylpiperidine of the formula

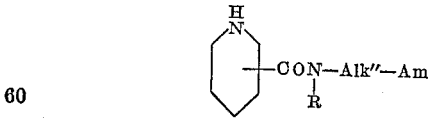

wherein Alk", Am, and R are defined as before. Suitable solvents are ethanol, butanone, toluene, dimethylformamide, and the like, a representative set of conditions for the contemplated manufacture being 12 or more hours at the boiling point under reflux in butanone medium.

An acid acceptor such as potassium carbonate or a tertiary amine, and a catalyst such as sodium iodide, may be incorporated in the reaction mixture if desired.

Conversion of the amine bases hereof to corresponding acid addition salts is accomplished by simple admixture of these compounds with one or more equivalents of any of various inorganic and strong organic acids, the anionic portions of which conform to X as hereinabove defined.

The quaternary ammonium compounds comprehended by this invention are those derived by contacting a claimed base with one or more equivalents of an organic ester of the formula

Q—T

Q and T being limited by the meanings hereinbefore assigned and it being additionally provided that Q is not hydrogen. Quaternization takes place in the temperature range between 25° and 100° centigrade, using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70° centigrade, the reaction time being approximately 1 hour.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury or atmospheres, and relative amounts of materials in parts by weight, except as otherwise noted.

Example 1

(A) *4-(2 - diethylaminoethylcarbamoyl)piperidine.*—A mixture of 4 parts of platinum oxide and 21 parts of 4-(2 - diethylaminoethylcarbamoyl)pyridine dissolved in 600 parts of acetic acid and 200 parts of water is maintained under approximately 70 atmospheres of hydrogen at room temperatures for 24 hours. Reduction thereupon being completed, the mixture is filtered; and the filtrate is stripped of solvent by vacuum distillation. The residue is made alkaline and then extracted with chloroform, following which the chloroform extract is dried over anhydrous potassium carbonate and then distilled in vacuo. The fraction coming over at 165–166°/1 mm. is 4-(2-diethylaminoethylcarbamoyl)piperidine.

(B) *10-{3-[4-(2 - diethylaminoethylcarbamoyl)-piperidino]propyl}phenothiazine.*—A mixture of 138 parts of 10-(3-chloropropyl)phenothiazine, 114 parts of 4-(2-diethylaminoethylcarbamoyl)piperidine, 38 parts of sodium iodide, 69 parts of potassium carbonate, and 2500 parts of butanone is heated at the boiling point under reflux for 16 hours, then cooled and filtered. The filtrate is freed of solvent by vacuum distillation, and the residue is extracted with chloroform. The chloroform extract is washed with water and then extracted with hydrochloric acid. The hydrochloric acid extract is made alkaline with aqueous sodium hydroxide, and the resultant mixture is extracted with benzene. The benzene extract is dried over anhydrous sodium carbonate and filtered, and the filtrate is stripped of solvent by vacuum distillation. The residual dark brown oil is the desired 10-{3-[4-(2-diethylaminoethylcarbamoyl)piperidino]propyl}phenothiazine, of the formula

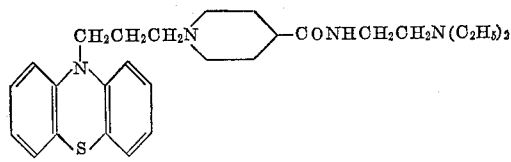

(C) *10-{3-[4-(2 - diethylaminoethylcarbamoyl)-piperidino]propyl}phenothiazine dioxalate.*—To a solution of 26 parts of 10-{3-[4-(2-diethylaminoethylcarbamoyl)-piperidino]propyl}phenothiazine in 100 parts of 95% ethanol is added a solution of 9 parts of oxalic acid in 100 parts of 95% ethanol. The resultant mixture is heated to the boiling point, whereat just sufficient water is added to dissolve the precipitated oil. On cooling, solid crystalline 10-{3 - [4 - (2 - diethylaminoethylcarbamoyl)piperidino]propyl}phenothiazine dioxalate precipitates, which, filtered off, washed on the filter with anhydrous ethanol, and recrystallized from 85% ethanol, melts at 102–115° with the evolution of gas.

Example 2

(A) *4 - (3-diethylaminopropylcarbamoyl)piperidine.*—Substituting approximately 200 parts of 4-(3-diethylaminopropylcarbamoyl)pyridine for the 4-(2-diethylaminoethylcarbamoyl)pyridine called for in Example 1A and using 35 rather than the 70 atmospheres of hydrogen specified therein, one obtains by a procedure otherwise identical, 4-(3-diethylaminopropylcarbamoyl)piperidine, B.P. 183–185°/1 mm.

(B) *10-{3-[4-(3-diethylaminopropylcarbamoyl)-piperidino]propyl}phenothiazine.*—Substitution of 121 parts of 4-(3-diethylaminopropylcarbamoyl)piperidine for the 4-(2-diethylaminoethylcarbamoyl)piperidine called for in Example 1B affords, by the procedure there detailed, 10-{3-[4-(3 - diethylaminopropylcarbamoyl)piperidino]propyl}-phenothiazine as a solid product which, recrystallized from a mixture of benzene and hexane, sinters at 75° and melts at 80–82° with gas evolution. The product has the formula

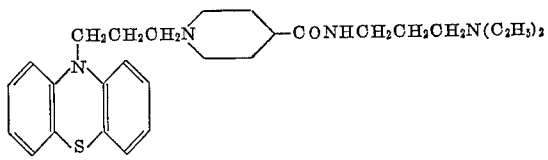

Example 3

(A) *2-chloro-10-{2-[4-(2-diethylaminoethylcarbamoyl)piperadino]ethyl}phenothiazine.*—Substitution of 148 parts of 2-chloro-10-(2-chloroethyl)phenothiazine for the 10-(3-chloropropyl)phenothiazine called for in Example 1B affords, by the procedure there detailed, 2-chloro-10-{2-[4-(2 - diethylaminoethylcarbamoyl) - piperidino]ethyl} phenothiazine as a light brown oil. The product has the formula

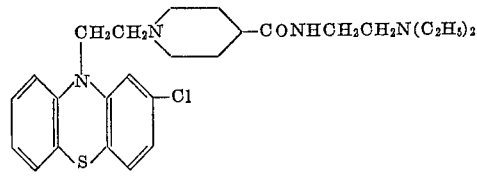

(B) *2-chloro-10-{2-[4-(2-diethylaminoethylcarbamoyl) piperidino]ethyl}phenothiazine dihydrochloride.* — An acetone solution of 2-chloro-10-{2-[4-(2-diethylaminoethylcarbamoyl)piperidino]ethyl}phenothiazine is acidified with hydrogen chloride dissolved in 2-propanol. The oil which precipitates is redissolved by the addition of a minimum amount of anhydrous ethanol at the boiling point of the mixture. On cooling, solid crystalline 2-chloro-10-{2 - [4-(2-diethylaminoethylcarbamoyl)piperidino]-ethyl}phenothiazine dihydrochloride precipitates, which, filtered off, washed on the filter with acetone, and recrystallized from anhydrous ethanol, melts at 215–219°.

Example 4

(A) *2-chloro-10-{3-[4-(2-diethylaminoethylcarbamoyl) piperidino]propyl}phenothiazine.*—Substitution of 155 parts of 2-chloro-10-(3-chloropropyl)phenothiazine for the 10-(3-chloropropyl)phenothiazine called for in Example 1B affords, by the procedure there detailed, 2-chloro-10-{3-[4 - (2-diethylaminoethylcarbamoyl)piperidino]-propyl}phenothiazine as a dark-colored oil. The product has the formula

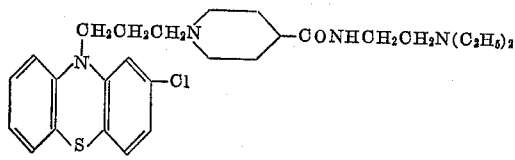

(B) *2-chloro-10-{3-[4-(2-diethylaminoethylcarbamoyl) piperidino]propyl}phenothiazine dihydrochloride.*—A solution of 185 parts of 2-chloro-10-{3-[4-(2-diethylaminoethylcarbamoyl)piperidino]propyl}phenothiazine in 1000 parts of acetone is made acid with hydrogen chloride dissolved in 2-propanol. The oil which precipitates is redissolved by heating the reaction mixture to the boiling point and adding thereat the minimum quantity of anhydrous ethanol necessary for this purpose. On cooling, solid crystalline 2-chloro-10-{3-[4-(2-diethylaminoethylcarbamoyl)piperidino]propyl}-phenothiazine dihydrochloride precipitates, which sinters at 192° and melts at 195-200° with gas evolution.

Example 5

(A) *3-(2-diethylaminoethylcarbamoyl)pyridine.* — A mixture of 100 parts of ethyl nicotinate and 100 parts of 2-diethylaminoethylamine is heated at the boiling point under reflux overnight, then distilled. The fraction coming over at 180°/1 mm. is 3-(2-diethylaminoethylcarbamoyl)pyridine.

(B) *3 - (2 - diethylaminoethylcarbamoyl)piperidine.*—Substituting 129 parts of 3-(2-diethylaminoethylcarbamoyl)-pyridine for the 4-(2-diethylaminoethylcarbamoyl) pyridine called for in Example 1A and using 50 rather than the 70 atmospheres of hydrogen specified therein, one obtains by a procedure otherwise identical, 3-(2-diethylaminoethylcarbamoyl)piperidine, B.P. 155–156°/1 mm.

(C) *2-chloro - 10-{3-[3-(2-diethylaminoethylcarbamoyl)piperidino]propyl}phenothiazine.* — Substitution of 155 parts of 2-chloro-10-(3-chloropropyl)phenothiazine and 114 parts of 3-(2-diethylaminoethylcarbamoyl)piperidine for the 10-(3-chloropropyl)phenothiazine and 4-(2-diethylaminoethylcarbamoyl) piperidine, respectively, called for in Example 1B affords, by the procedure there detailed, 2-chloro-10-{3-[3-(2-diethylaminoethylcarbamoyl)piperidino]propyl}phenothiazine as an oil, resistant the crystallization. The product has the formula

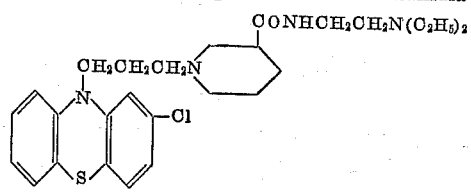

Example 6

(A) *2 - chloro - 10 - {4 - [4 - (2 - diethylaminoethylcarbamoyl)piperidino]butyl}phenothiazine.*—Substitution of 163 parts of 2-chloro-10-)4-chlorobutyl)phenothiazine for the 10-(3-chloropropyl)phenothiazine called for in Example 1B affords, by the procedure there detailed, 2-chloro-10- {4-[4-(2-diethylaminoethylcarbamoyl)piperidino]-butyl}phenothiazine as an oil, resistant to crystallization. The product has the formula

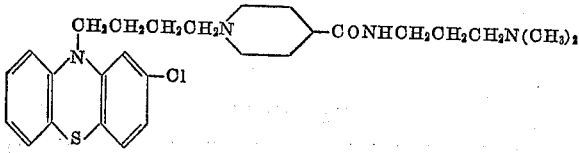

(B) *2 - chloro - 10 - {4 - [4 - (2 - diethylaminoethylcarbamoyl)piperidino]butyl}phenothiazine dihydrochloride.*—An absolute ethanol solution of 2-chloro-10-{4-[4-(2-diethylaminoethylcarbamoyl)piperidino]butyl}phenothiazine is acidified with hydrogen chloride dissolved in 2-propanol and then diluted with just sufficient acetone to produce incipient turbidity. On chilling to 0°, 2-chloro-10-{4 - [4 - (2 - diethylaminoethylcarbamoyl)piperidino]butyl}-phenothiazine dihydrochloride precipitates as a crystalline solid, which, filtered off and dried in air, melts at 180–183°.

Example 7

(A) *4-(3-dimethylaminopropylcarbamoyl)piperidine.*—Substituting 138 parts of 4-(3-dimethylaminopropylcarbamoyl)-pyridine for the 4-(2-diethylaminoethylcarbamoyl)pyridine called for in Example 1A and using approximately 40 rather than the 70 atmospheres of hydrogen specified therein, one obtains by a procedure otherwise identical, 4-(3-dimethylaminopropylcarbamoyl) piperidine, B.P. 167–170°/1 mm.

(B) *2 - chloro - 10 - {3 - [4 - (3-dimethylaminopropylcarbamoyl) piperidino] propyl}phenothiazine.*—Substitution of 155 parts of 2-chloro-10-(3-chloropropyl)phenothiazine and 107 parts of 4-(3-dimethylaminopropylcarbamoyl)-piperidine for the 10-(3-chloropropyl)phenothiazine and 4-(2-diethylaminoethylcarbamoyl)piperidine, respectively, called for in Example 1B affords, by the procedure there detailed, 2-chloro-10-{3-[4-(3-dimethylaminopropylcarbamoyl)-piperidino]propyl}phenothiazine as an oil, resistant to crystallization. The product has the formula (C) *2-chloro-10 - {3-[4 - (3 - dimethylaminopropylcarbamoyl)piperidino[propyl}phenothiazine dioxalate.*—To a solution of 113 parts of 2-chloro-10-{3-[4-(3-dimethylaminopropylcarbamoyl)piperidino]propyl}-phenothiazine in 500 parts of acetone is added 44 parts of oxalic acid dissolved in 500 parts of acetone. An oil precipitates. The mixture is heated to the boiling point and sufficient aqueous 90% ethanol is introduced to induce solution. On chilling to 0°, 2-chloro-10-{3-[4-(3-dimethylaminopropylcarbamoyl)piperidino]propyl}-phenothiazine dioxalate precipitates as a crystalline solid, M.P. 119–122° with gas evolution.

Example 8

*2-chloro-10-{3-[4 - (3 - diethylaminopropylcarbamoyl)-piperidino]propyl}phenothiazine.*—Substitution of 155 parts of 2-chloro-10-(3-chloropropyl)phenothiazine and 121 parts of 4-(3-diethylaminopropylcarbamoyl)piperidine for the 10-(3-chloropropyl)phenothiazine and 4-(2-diethylaminoethylcarbamoyl) piperidine, respectively, called for in Example 1B affords, by the procedure there detailed, 2-chloro-10-{3 - [4 - (3 - diethylaminopropylcarbamoyl)-piperidino]propyl}phenothiazine as an oil, resistant to crystallization. The product has the formula

Example 9

(A) *2-(3-diethylaminopropylcarbamoyl)piperidine.*—A mixture of 4 parts of platinum oxide and 60 parts of 2-(3-diethylaminopropylcarbamoyl)pyridine dissolved in 500 parts of glacial acetic acid and 100 parts of water is maintained under approximately 50 atmospheres of hydrogen at room temperatures until the uptake of hydrogen indicates that reduction of the pyridine ring is complete.

The mixture is then filtered, and the filtrate is stripped of solvent by vacuum distillation. The residue is made strongly alkaline and then extracted with chloroform, whereupon the chloroform extract is dried over anhydrous potassium carbonate and then distilled in vacuo. The fraction coming over at 158–160°/1 mm. is 2-(3-diethylaminopropylcarbamoyl)-piperidine.

(B) *2-chloro-10-{3-[2-(3-diethylaminopropylcarbamoyl)piperidino]propyl}phenothiazine.*—Substitution of 155 parts of 2-chloro-10-(3-chloropropyl)phenothiazine and 121 parts of 2-(3-diethylaminopropylcarbamoyl)piperidine for the 10-(3-chloropropyl)phenothiazine and 4-(2-diethylaminoethylcarbamoyl) piperidine, respectively, called for in Example 1B affords, by the procedure there detailed, 2-chloro-10-{3 - [2 - (3 - diethylaminopropylcarbamoyl)-piperidino]propyy}phenothiazine as an oil, resistant to crystallization. The product has the formula

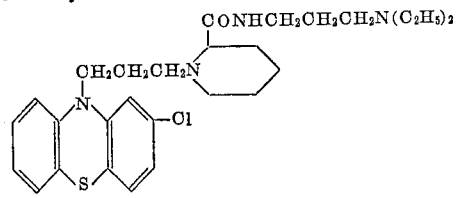

(C) *2 - chloro-10-{3-[2 - (3 - diethylaminopropylcarbamoyl)piperidino]propyl}phenothiazine dioxalate.*—A solution of 150 parts of 2-chloro-10-{3-[2-(3-diethylaminopropylcarbamoyl)piperidino]propyl}phenothiazine in 500 parts of acetone is acidified with oxalic acid dissolved in 500 parts of acetone. The oil which precipitates is redissolved by heating the mixture to the boiling point and adding 750 parts of absolute ethanol. On chilling, solid crystalline 2-chloro-10-{3-[2-(3-diethylaminopropylcarbamoyl)piperidino]propyl}phenothiazine dioxalate precipitates, which, filtered off and dried in air, sinters at 128°, melts at 131–135°, and clears with evolution of gas at 162°.

Example 10

(A) *4-(2 - piperidinoethylcarbamoyl)piperidine.*—Substituting 75 parts of 4-(2-piperidinoethylcarbamoyl)pyridine for the 4-(2-diethylaminoethylcarbamoyl)pyridine called for in Example 1A and using approximately 50 rather than the 70 atmospheres of hydrogen specified therein, one obtains by a procedure otherwise identical, 4-(2-piperidinoethylcarbamoyl)piperidine.

(B) *2 - chloro-10-{2-[4-(2-piperidinoethylcarbamoyl)-piperidino]ethyl}phenothiazine.*—Substitution of 148 parts of 2-chloro-10-(2-chloroethyl)phenothiazine and 120 parts of 4-(2-piperidinoethylcarbamoyl)piperidine for the 10-(3-chloropropyl)phenothiazine and 4-(2-diethylaminoethylcarbamoyl)piperidine, respectively, called for in Example 1B affords, by the procedure there detailed, 2-chloro-10-{2-[4 - (2 - piperidinoethylcarbamoyl)piperidino]-ethyl}phenothiazine. The product has the formula

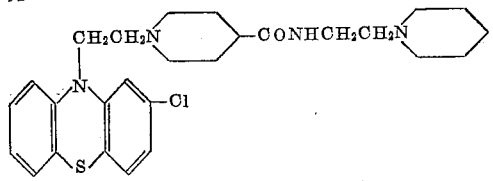

Example 11

(A) *4-(3-pyrrolidinopropylcarbamoyl)piperidine.*—Substituting 80 parts of 4-(3-pyrrolidinopropylcarbamoyl)-pyridine called for in Example 1A and using approximately 40 rather than the 70 atmospheres of hydrogen specified therein, one obtains by a procedure otherwise identical, 4 - (3 - pyrrolidinopropylcarbamoyl)piperidine, B.P. 184–186°/1 mm.

(B) *2-chloro-10-{3-[4-(3-pyrrolidinopropylcarbamoyl) piperidino]propyl}phenothiazine.*—Substitution of 155 parts of 2-chloro-10-(3-chloropropyl)phenothiazine and 119 parts of 4-(3-pyrrolidinopropylcarbamoyl)piperidine for the 10-(3-chloropropyl)phenothiazine and 4-(2-diethylaminoethylcarbamoyl)piperidine, respectively, called for in Example 1B affords, by the procedure there detailed, 2-chloro-10-{3-[4-(3 - pyrrolidinopropylcarbamoyl) piperidino]propyl}phenothiazine as a brown oil, resistant to crystallization. The product has the formula

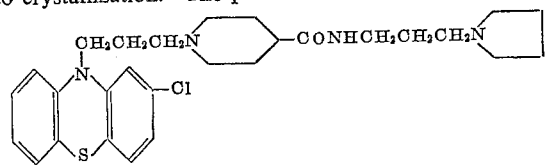

(C) *2-chloro-10-{3-[4-(3-pyrrolidinopropylcarbamoyl) piperidino]propyl}phenothiazine dioxalate.*—An anhydrous ethanolic solution of 2-chloro-10-{3-[4-(3-pyrrolidinopropylcarbamoyl)piperidino]propyl}phenothiazine is acidified with oxalic acid dissolved in acetone. An oil precipitates. The mixture is heated to the boiling point and sufficient water introduced thereat to redissolve the oil. Upon cooling, 2-chloro-10-{3-[4-(3-pyrrolidinopropylcarbamoyl)piperidino]propyl}phenothiazine dioxalate precipitates as a crystalline solid, M.P. 112–115° with gas evolution.

Example 12

(A) *2-acetyl-10-{3-[4-(2-diethylaminoethylcarbamoyl) piperidino]propyl}phenothiazine.*—Substitution of 159 parts of 2-acetyl-10-(3-chloropropyl)phenothiazine for the 10-(3-chloropropyl)phenothiazine called for in Example 1B affords, by the procedure there detailed, 2 - acetyl-10-{3-[4-(2-diethylaminoethylcarbamoyl)piperidino]propyl}phenothiazine as a light brown oil. The product has the formula

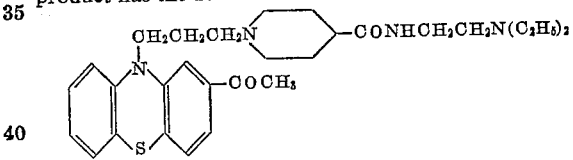

(B) *2-acetyl-10-{3-[4-(2-diethylaminoethylcarbamoyl) piperidino]propyl}phenothiazine dihydrochloride.* — By the procedure of Example 3B, but substituting 2-acetyl-10 - {3 - [4 - (2-diethylaminoethylcarbamoyl)piperidino] propyl}phenothiazine for the 2-chloro - 10 - {2 - [4 - diethylaminoethylcarbamoyl)piperidino]ethyl}phenothiazine called for therein, one obtains 2-acetyl-10-{3-[4-(2-diethylaminoethylcarbamoyl)piperidino]propyl}phenothiazine dihydrochloride as a crystalline product sintering at 162° and melting with gas evolution at 169–173°.

Example 13

*10 - {2 - [4-(3-dimethylaminopropylcarbamoyl)piperidino]ethyl} - 2 - propionylphenothiazine.*—Substitution of 159 parts of 10-(2-chloroethyl)-2-propionylphenothiazine and 107 parts of 4-(3-dimethylaminopropylcarbamoyl) piperidine for the 10-(3-chloropropyl)phenothiazine and 4-(2-diethylaminoethylcarbamoyl)piperidine, respectively, called for in Example 1B affords, by the procedure there detailed, 10-{2-[4 - (3 - dimethylaminopropylcarbamoyl) piperidino]ethyl}-2-propionylphenothiazine. The product has the formula

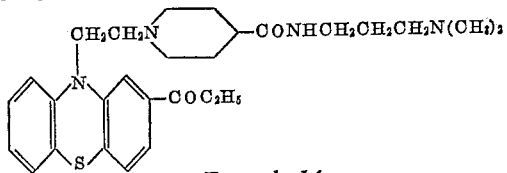

Example 14

(A) *N,N,N'-triethylpropane-1,3-diamine.*—A mixture of 94 parts of N,N-diethylpropane-1,3-diamine, 55 parts of acetaldehyde, 1 part of Raney nickel, and 100 parts of absolute ethanol is maintained with agitation under 35 atmospheres of hydrogen at 70° for 4½ hours, at which point catalyst is filtered out; and the filtrate is distilled in vacuo. The fraction coming over at 45–80°/6 mm. is the desired N,N,N'-triethylpropane-1,3-diamine.

(B) *4 - (ethyl-3-diethylaminopropylcarbamoyl) - pyridine.*—To a solution of 281 parts of pyridine-4-carboxylic acid and 258 parts of triethylamine in 9000 parts of dichloromethane cooled to 0° is added 257 parts of ethyl chloroformate followed by 340 parts of N,N,N'-triethylpropane-1,3-diamine, both additions being so paced that the temperature of the reaction mixture does not exceed 0° in process. The resultant mixture is maintained at —5° to 0° for 30 minutes, then allowed to warm to room temperatures and stripped of solvent by vacuum distillation. The residue is extracted with benzene, and the benzene extract is distilled in vacuo. The fraction coming over at 150–160°/0.5 mm. is 4-(ethyl-3-diethylaminopropylcarbamoyl)pyridine.

(C) *4-(ethyl-3-diethylaminopropylcarbamoyl) - piperidine.*—A mixture of approximately 3 parts of ruthenium oxide and 240 parts of 4-(ethyl-3-diethyaminopropylcarbamoyl)pyridine dissolved in 150 parts of dioxane is maintained under approximately 70 atmospheres of hydrogen at 100° for 3½ hours. Reduction thereupon being completed, the mixture is filtered; and the filtrate is distilled in vacuo. The fraction coming over at 130–134°/0.2 mm. is the desired 4-(ethyl-3-diethylaminopropylcarbamoyl)piperidine.

(D) *2 - chloro-10-{3-[4-(ethyl-3-diethylaminopropylcarbamoyl)piperidino]propyl}phenothiazine.*—A mixture of 73 parts of 2-chloro-10-(3-chloropropyl)-phenothiazine, 50 parts of 4-(ethyl-3-diethylaminopropylcarbamoyl piperidine, 9 parts of potassium iodide, 60 parts of anhydrous sodium carbonate, and 2000 parts of butanone is heated at the boiling point under reflux for 16 hours, then cooled and filtered. The filtrate is freed of solvent by vacuum distillation, and the residue is extracted with chloroform. The chloroform extract is washed with water and then extracted with hydrochloric acid. The hydrochloric acid extract is made alkaline with aqueous sodium hydroxide, and the resultant mixture is extracted with benzene. The benzene extract is dried over anhydrous potassium carbonate and filtered, and the filtrate is stripped of solvent by vacuum distillation. The residual dark brown oil is the desired 2-chloro-10-{3-[4-(ethyl-3 - diethylaminopropylcarbamoyl ) piperidino ] propyl}-phenothiazine, of the formula

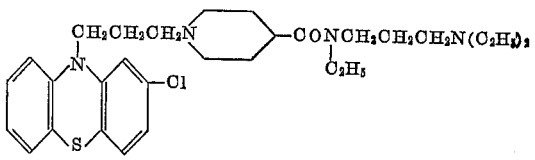

(E) *2 - chloro - 10-{3-[4-(ethyl-3-diethylaminopropylcarbamoyl)piperidino]propyl}phenothiazine dioxalate.*— A solution of 65 parts of 2-chloro-10-{3-[4-(ethyl-3-diethylaminopropylcarbamoyl) piperidino]propyl}phenothiazine in 500 parts of acetone is made acid with oxalic acid dissolved in 500 parts of acetone. An oil precipitates. The mixture is heated to the boiling point and sufficient water introduced thereat to induce solution. On chilling to 0°, 2-chloro-10-{3-[4-(ethyl-3-diethylaminopropylcarbamoyl )piperidino]propyl}phenothiazine dioxalate precipitates as a crystalline solid, sintering at 134°, melting at around 144°, and evolving gas at 170°.

What is claimed is:

1. A compound of the formula

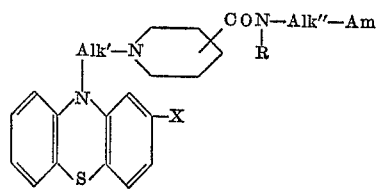

wherein X represents a member of the class consisting of hydrogen, chlorine, and lower alkanoyl radicals of the formula —CO—alkyl in which the alkyl group called for contains fewer than 4 carbon atoms; Alk' and Alk" represent lower alkylene radicals separating the groups attached thereto by more than 1 carbon atom and having the formula $-C_nH_{2n}-$ in which $n$ represents a positive integer less than 6; R represents a member of the class consisting of hydrogen and lower alkyl radicals of the formula $-C_nH_{2n+1}$ in which $n$ represents a positive integer less than 9; and Am represents a member of the class consisting of radicals having the formulas —N(lower alkyl)₂

and

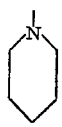

2. A compound of the formula

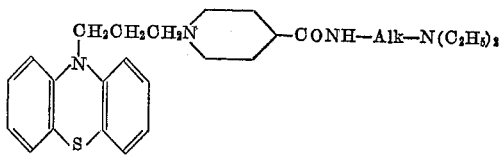

wherein Alk represents a lower alkylene radical separating the groups attached thereto by more than 1 carbon atom and having the formula $-C_nH_{2n}-$ in which $n$ represents a positive integer less than 6.

3. 10 - {3-[4-(3-diethylaminopropylcarbamoyl) - piperidino]propyl}phenothiazine.

4. A compound of the formula

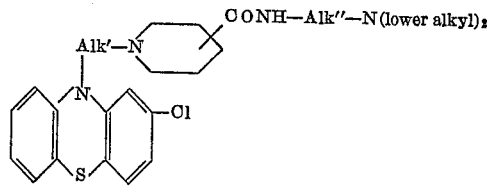

wherein Alk' and Alk" represent lower alkylene radicals separating the groups attached thereto by more than 1 carbon atom and having the formula $-C_nH_{2n}-$ in which $n$ represents a positive integer less than 6.

5. 2-chloro-10 - {3-[4-(2-diethylaminoethylcarbamoyl)-piperidino]propyl}phenothiazine.

6. 2 - chloro - 10-{3-[4-(3-diethylaminopropylcarbamoyl)piperidino]propyl}phenothiazine.

7. 2 - chloro - 10-{2-[4-(2-piperidinoethylcarbamoyl)-piperidino]ethyl}phenothiazine.

8. 2 - chloro-10-{3-[4-(3-pyrrolidinopropylcarbamoyl)-piperidino]propyl}phenothiazine.

9. A compound of the formula

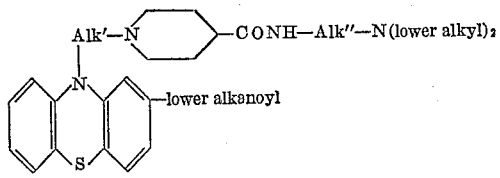

wherein the lower alkanoyl radical called for contains fewer than 5 carbon atoms and Alk' and Alk" represent lower alkylene radicals separating the groups attached thereto by more than 1 carbon atom and having the formula

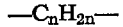

in which $n$ represents a positive integer less than 6.

10. 2-acetyl-10-{3-[4-(2-diethylaminoethylcarbamoyl)-piperidino]propyl}phenothiazine.

11. 2-chloro-10-{3-[4-(ethyl-3-diethylamino-propylcarbamoyl)piperidino]propyl}phenothiazine.

References Cited in the file of this patent

UNITED STATES PATENTS 2,534,237    Cusic  ---------------- Dec. 19, 1950

FOREIGN PATENTS 560,750    Belgium  -------------- Sept. 30, 1957
562,299    Belgium  -------------- May 12, 1958

OTHER REFERENCES

Cusic et al.: 135th ACS Meeting, Apr. 5–10, 1959.
Russell: "Diseases of the Nervous System," vol. 22, No. 2, pages 5 to 6 (February 1961).

UNITED STATES PATENT OFFICE
CERTIFICATE OF CORRECTION

Patent No. 3,055,891                                    September 25, 1962

John W. Cusic et al.

It is hereby certified that error appears in the above numbered patent requiring correction and that the said Letters Patent should read as corrected below.

Column 1, line 69, strike out "a", second occurrence; column 3, lines 49 and 74, for "-diethylaminoethylcarbamoyl)-piperi-", in italics, each occurrence, read -- -diethylaminoethylcarbamoyl)piperi- --, in italics; column 4, line 1, for "-diethylaminoethylcarbamoyl)-pi-" read -- -diethylaminoethylcarbamoyl)pi- --; line 22, for "-diethylaminopropylcarbamoyl)-piper-", in italics, read -- -diethylaminopropylcarbamoyl)piper --, in italics; line 40, for "-diethylaminoethylcarbamoyl)", in italics, read -- -diethylaminoethylcarbamoyl)- --, in italics; line 45, for "-diethylaminoethylcarbamoyl)-piperidino]eth-" read -- -diethylaminoethylcarbamoyl)piperidino]eth- --; lines 56 and 70, for "-diethylaminoethylcarbamoyl)", in italics, each occurrence, read -- -diethylaminoethylcarbamoyl)- --, in italics; same column 4, line 64, for "idino]-ethyl}phenothiazin read -- idino]ethyl}phenothiazine --; column 5, line 1, for "idino]-propyl}phenothiazine" read -- idino]propyl}phenothiazin --; line 19, for "carbamoyl)piperidino]propyl}-phenothiazine" read -- carbamoyl)piperidino]propyl}phenothiazine --; line 32, for "oyl)-pyridine" read -- oyl)pyridine --; same line 32, for "4-(2-diethylaminoethylcarbamoyl)" read -- 4-(2-diethylaminoethylcarbamoyl)- --; line 60, for "-10-)4-" read -- -10-(4- --; line 64, for "dino]-butyl}phenothiazine" read -- dino]butyl}phenothiazine --; same column 5, lines 66 to 72, upper right-hand portion of the formula, for "-CONHCH$_2$CH$_2$CH$_2$N(CH$_3$)$_2$" read -- -CONHCH$_2$CH$_2$N(C$_2$H$_5$)$_2$ --; column 6, line 12, for "bamoyl)-pyridine" read -- bamoyl)pyridine --; line 17, for "-dimethylaminopropylcarbamoyl)" read -- -dimethylaminopropylcarbamoyl)- --; line 23, for "bamoyl)-piperidine" read -- bamoyl)piperidine --; line 26, for "aminopropylcarbamoyl)-piperidino]propyl}phenothiazine" read -- aminopropylcarbamoyl)piperidino]propyl}phenothiazine --; line 39, for "aminopropylcarbamoyl)piperidino]propyl}-phenothiazine" read -- aminopropylcarbamoyl)piperidino]propyl}phenothiazine --; line 46, for "propylcarbamoyl)piperidino]propyl}-phenothiazine" read -- propylcarbamoyl)piperidino]propyl}phenothiazine --; same column 6, line 59, for "bamoyl)-piperidino]propyl}phenothiazine" read -- bamoyl)piperidino]propyl}phenothiazine --; column 7, line 7, for "aminopropylcarbamoyl)-piperidine" read -- aminopropylcarbamoyl)piperidine --; line 16, for "bamoyl)-piperidino]propyy}phenothiazine" read -- bamoyl)piperidino]propyl}phenothiazine --; line 67, for "pyridine called for in Example 1A and using approxi-" read -- pyridine for the 4-(2-diethyl- 3,055,891 aminoethylcarbamoyl)pyridine called for in Example 1A and using approxi- --; same column 7, line 73, and column 8, line 15, for "-pyrrolidinopropylcarbamoyl)", in italics, each occurrence, read -- -pyrrolidinopropylcarbamoyl)- --; in italics; column 8, line 5, for "-pyrrolidinopropylcarbamoyl)" read -- -pyrrolidinopropylcarbamoyl)- --; lines 28 and 42, for "-diethylaminoethylcarbamoyl)", in italics, each occurrence, read -- -diethylaminoethylcarbamoyl)- --, in italics; line 45, for "-diethylaminoethylcarbamoyl)piperidino]" read -- -diethylaminoethylcarbamoyl)piperidino]- --; same column 8, lines 57 and 61, for "-dimethylaminopropylcarbamoyl)", each occurrence, read -- -dimethylaminopropylcarbamoyl)- --; column 9, line 5, for "-diethylaminopropylcarbamoyl)-pyri-", in italics, read -- -diethylaminopropylcarbamoyl)pyri- --, in italics; line 19, for " -diethylaminopropylcarbamoyl)-piperi-", in italics, read -- -diethylaminopropylcarbamoyl)piperi- --, in italics; same column 9, line 31, for "-(3-chloropropyl)-phenothia-" read -- -(3-chloropropyl)phenothia- --; column 10, line 49, for "-diethylaminopropylcarbamoyl)-piperi-" read -- -diethylaminopropylcarbamoyl)-piperi- --.

Signed and sealed this 19th day of November 1963.

(SEAL)
Attest:

ERNEST W. SWIDER
Attesting Officer

EDWIN L. REYNOLDS
Acting Commissioner
of Patents